(12) United States Patent
Wilkinson et al.

(10) Patent No.: US 11,391,199 B2
(45) Date of Patent: Jul. 19, 2022

(54) METHOD AND APPARATUS FOR PREDICTING TURBOCHARGER FAILURE MODES

(71) Applicant: Perkins Engines Company Limited, Peterborough (GB)

(72) Inventors: David Wilkinson, Peterborough (GB); Prabhu Ramasamy, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 108 days.

(21) Appl. No.: 16/898,053

(22) Filed: Jun. 10, 2020

(65) Prior Publication Data

US 2020/0408140 A1 Dec. 31, 2020

(30) Foreign Application Priority Data

Jun. 25, 2019 (GB) ..................... 1909145

(51) Int. Cl.
*F02B 37/00* (2006.01)
*G01H 11/06* (2006.01)
*G01M 13/045* (2019.01)
*G01P 15/18* (2013.01)
*G01H 1/00* (2006.01)

(52) U.S. Cl.
CPC ............. *F02B 37/00* (2013.01); *G01H 1/006* (2013.01); *G01H 11/06* (2013.01); *G01M 13/045* (2013.01); *G01P 15/18* (2013.01); *F05D 2220/40* (2013.01); *F05D 2260/80* (2013.01)

(58) Field of Classification Search
CPC ........ F01D 21/00; F01D 21/003; F02B 37/00; F02B 39/16; F02C 6/12; F05D 2220/40; F05D 2240/50; F05D 2260/80; F16C 19/527; F16C 2233/00; F16C 2360/24; G01H 1/003; G01H 1/006; G01H 1/14; G01H 11/06; G01M 1/22; G01M 13/028; G01M 13/045; G01M 15/12; G01M 15/14; G01M 7/00; G01N 2291/2696; G01P 15/18; Y02T 10/12
See application file for complete search history.

(56) References Cited

U.S. PATENT DOCUMENTS 4,453,407 A   6/1984   Sato et al.
4,887,468 A   12/1989  McKendree et al.
(Continued)

FOREIGN PATENT DOCUMENTS

FR           2972028 A1      8/2012
WO    WO 2014/0123443 A1    8/2014
WO    WO 2018/198956 A1    11/2018

OTHER PUBLICATIONS

Search Report for related GB Application No. 1909145.3; report dated Dec. 12, 2019.

*Primary Examiner* — David L Singer (57) ABSTRACT

A method of monitoring a turbocharger system makes use of vibrational behaviour to predict potential future failure modes. Changes in sub-synchronous vibrational behaviour of the turbocharger assembly may be used to distinguish between failure modes such as wear and coking. Rate of change of sub-synchronous vibrational behaviour may be used to predict time before likely failure. Also disclosed is a turbocharger system configured to perform the method.

15 Claims, 6 Drawing Sheets

(56) References Cited

U.S. PATENT DOCUMENTS

| | | | |
|---|---|---|---|
| 6,370,957 B1* | 4/2002 | Filippenko | G01H 1/003 |
| | | | 73/593 |
| 7,631,498 B2 | 12/2009 | Greentree | |
| 9,784,635 B2 | 10/2017 | Bizub | |
| 2003/0066352 A1* | 4/2003 | Leamy | G01H 1/08 |
| | | | 73/593 |
| 2005/0131620 A1* | 6/2005 | Bowyer | F02D 41/1401 |
| | | | 701/108 |
| 2007/0283695 A1 | 12/2007 | Figura | |
| 2010/0292937 A1* | 11/2010 | Hosny | G01M 13/045 |
| | | | 702/34 |
| 2013/0060417 A1 | 3/2013 | Ortei et al. | |
| 2019/0121342 A1* | 4/2019 | Celia | G05B 19/41865 |

* cited by examiner

METHOD AND APPARATUS FOR PREDICTING TURBOCHARGER FAILURE MODES

FIELD OF THE DISCLOSURE

The disclosure relates to a method and apparatus for predicting turbocharger failure modes through vibration analysis.

CROSS-REFERENCE TO RELATED APPLICATION

This application claims priority under 35 USC § 119 and the Paris Convention to Great Britain Patent Application No. 1909145.3 filed on Jun. 25, 2019.

BACKGROUND

Internal combustion engines, for example, diesel engines, gasoline engines, or natural gas engines employ turbochargers to deliver compressed air for combustion in the engine. A turbocharger compresses air flowing into the engine, helping to force more air into the combustion chambers of the engine. The increased supply of air allows increased fuel combustion in the combustion chambers of the engine, resulting in increased power output from the engine.

A typical turbocharger includes a shaft, a turbine wheel attached to one end of the shaft, a compressor wheel or impeller connected to the other end of the shaft, and bearings to support the shaft. Often a turbine housing surrounds the turbine wheel and a separate compressor housing surrounds the compressor wheel.

When the engine is operating, hot exhaust from the engine flows through the turbine housing and expands over the turbine wheel, rotating the turbine wheel and the shaft connected to the turbine wheel. The shaft in turn rotates the compressor wheel. Relatively cool air from the ambient flows through the compressor housing where the compressor wheel compresses the air and drives the compressed air into the combustion chambers of the engine.

Turbochargers typically operate at high rotational speeds. Speeds of 50,000 to 70,000 rpm are common. Such high speeds make for challenging conditions for the bearing system.

The compressor wheel and/or the turbine wheel may be unbalanced when its mass is distributed unevenly around its axis of rotation and the centre of mass is out of alignment with the centre of rotation. This may occur, for example, due to manufacturing tolerances but also as a consequence of use. For example, general wear of the shaft and, bearing and also, so called, coking of bearing lubricant may result in changes to the forces in play which in turn affect the vibrational behaviour of the compressor wheel and/or the turbine wheel. Such vibrations may not only affect the performance of the turbocharger but in turn they may impact its operating life, such as the life of the bearings.

Such failure modes are difficult to predict and to prevent. If failure occurs in use then there is a risk of significant and unplanned downtime awaiting and installing replacement parts.

It is known that measurement of vibrational behaviour of the turbocharger may provide some assistance in predicting potential turbocharger failure. In particular, it is known to compare magnitude of vibration at the frequency of rotation to a threshold vibration and to assume that exceeding the threshold is a predictor of future failure. This does not provide insight, regarding potential failure modes and therefore does not assist in determining which action might best be taken to mitigate the risk of failure.

SUMMARY OF THE DISCLOSURE

Against this background, there is provided a method of monitoring a turbocharger system, the method comprising:
measuring amplitude of vibration of the turbocharger system across a range of frequencies;
identifying a sub-range of frequencies within the range of frequencies that are at a higher frequency than maximum engine rotation frequency and at a lower frequency than maximum turbocharger rotation frequency wherein the sub-range of frequencies includes a local peak in amplitude of vibration;
determining a direction of change of a characteristic of the local peak in order to select between a first failure mode prediction strategy comprising a first failure mode threshold value and a second failure mode prediction strategy comprising a second failure mode threshold;
determining a rate of change the characteristic of the local peak; and
using the rate of change of the characteristic of the local peak to determine a time period after which the characteristic will cross a threshold value;
wherein in the first failure mode the threshold value is the first failure mode threshold value; and
wherein in the second failure mode the threshold value is the second failure mode threshold value.

DETAILED DESCRIPTION

Figure 1:
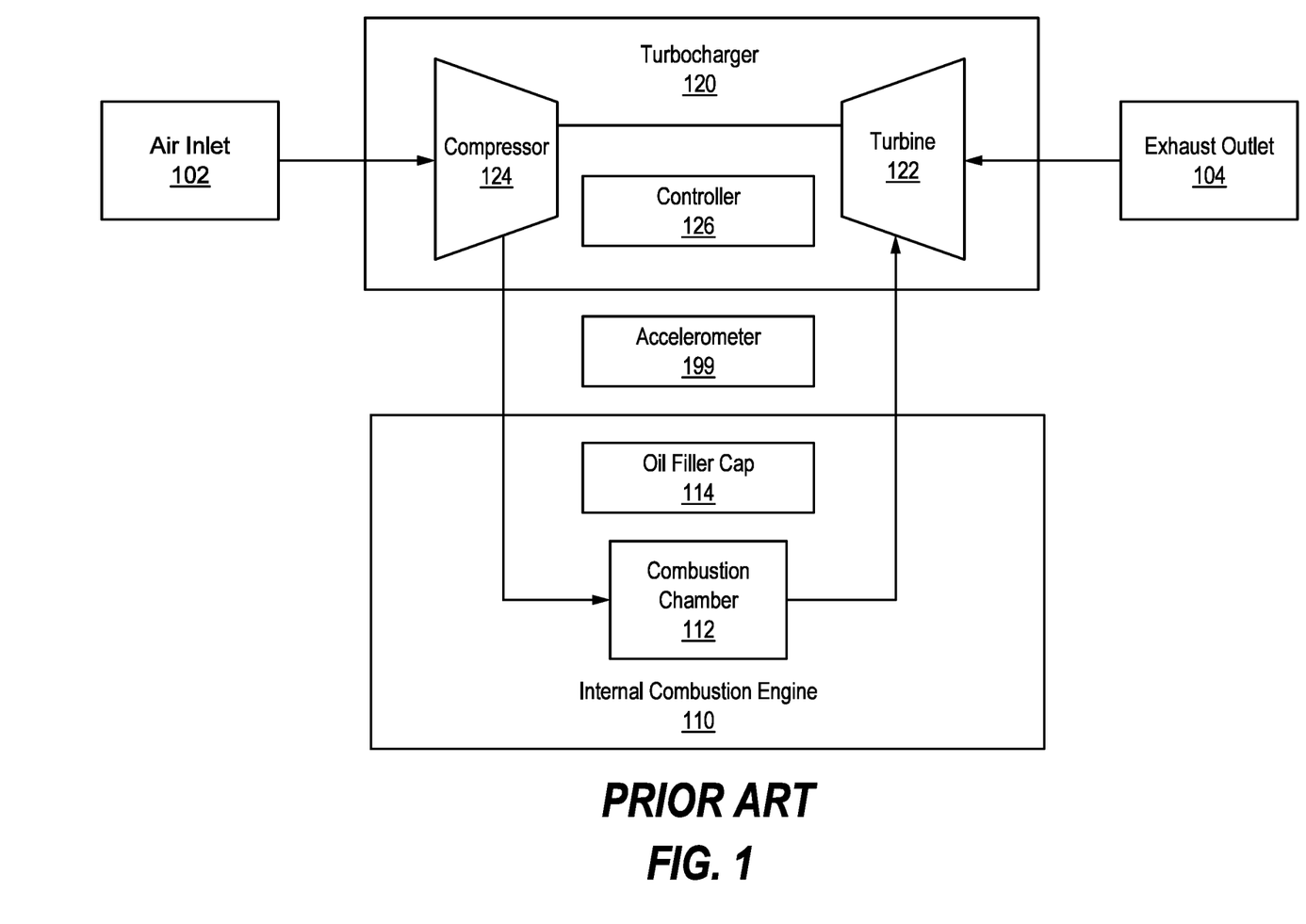
FIG. 1 shows a highly schematic representation of a conventional engine assembly 100 including a turbocharger system 120 to which the method of the present disclosure may be applied.

FIG. 1 shows a highly schematic representation of a straightforward, conventional engine assembly 100 including a turbocharger system 120 to which the method of the present disclosure may be applied.

The engine assembly 100 comprises an internal combustion engine 110, a turbocharger system 120, an air inlet module 102 and an exhaust outlet module 104.

The internal combustion engine 110 comprises a combustion chamber 112, The combustion chamber 110 may comprise one or more combustion cylinders 112. Each combustion cylinder 112 of the one or more combustion cylinders 112 may comprise a fuel injector (not shown).

The turbocharger system 120 comprises a turbine 122 and a compressor 124.

The turbine 124 is configured to receive exhaust gas from the combustion chamber 112, to recover energy from said exhaust gas, and to release said exhaust gas to exhaust outlet module 104.

The compressor 124 is configured to receive energy from the turbine 122 and thereby to compress air provided by the air inlet module 102 for use in combustion of fuel in the combustion chamber 112.

The method of the present disclosure may be used to predict different potential failure modes in the turbocharger and to provide an indication of when failure might be likely to occur.

Figure 2A:
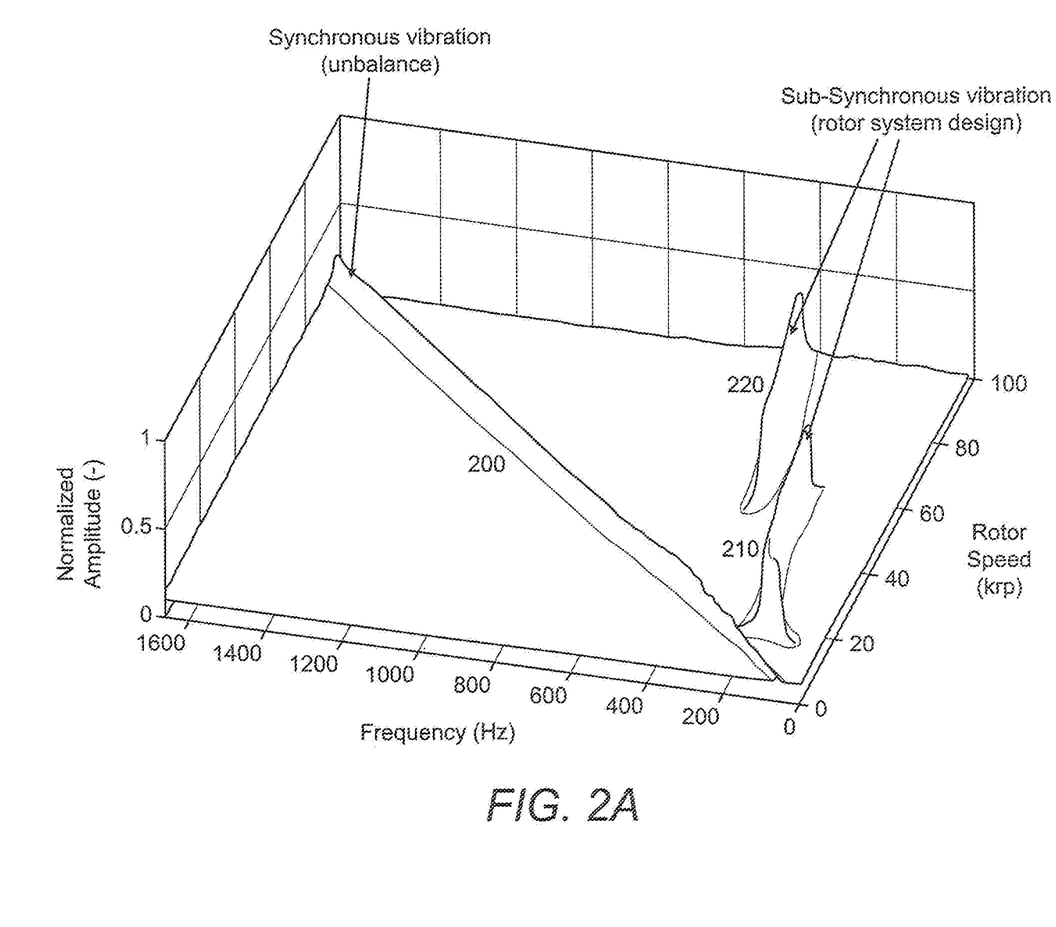
FIG. 2A shows a plot of frequencies detected by an accelerometer in the vicinity of the turbocharger versus rotational speed of the turbocharger.
Figure 2B:
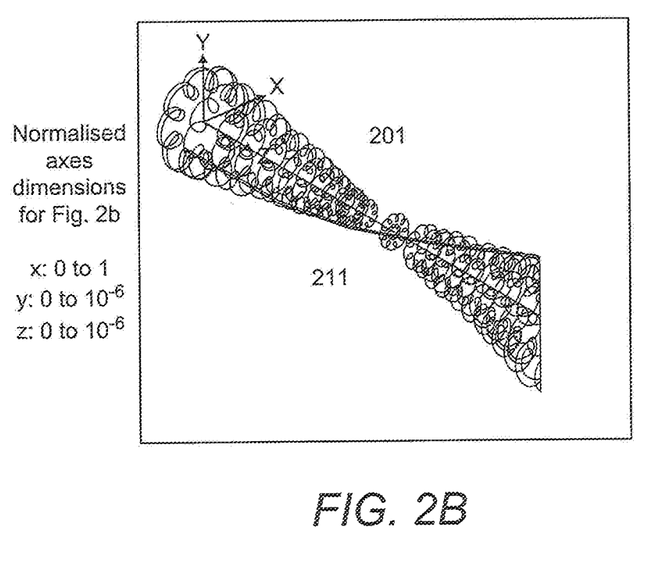
FIG. 2B shows vibrational behaviour of the turbocharger shaft wherein the x- and y-axes are six orders of magnitude different from the z-axis.
Figure 2C:
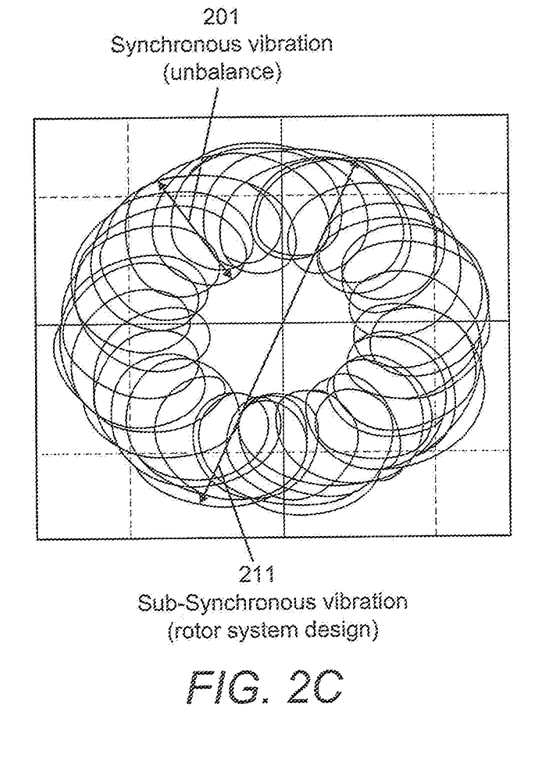
FIG. 2C shows vibrational behaviour of the turbocharger shaft in the e- and y-axes only.

FIG. 2 shows various graphical representations of vibrational behaviour of the turbocharger assembly 120. The vibration may be sensed by an accelerometer located on or in the vicinity of the turbocharger assembly 120. Since the turbocharger assembly 120 is used in conjunction with the internal combustion engine, the accelerometer may also be influenced by engine vibrations. Synchronous engine vibrations are not, shown in FIG. 2.

As can be seen from FIG. 2a, a first aspect of vibrational behaviour detected by the accelerometer are vibrations that are synchronous with the speed of rotation of the shaft of the turbocharger. These are represented by the straight line 200 going through the origin.

A second aspect of vibrational behaviour detected by the accelerometer are vibrations that are sub-synchronous, in the sense that they occur at a frequency lower than the synchronous frequency of rotation of the shaft of the turbocharger. As can be seen in FIG. 2, there are two such strands of sub-synchronous vibrations 210, 220. While some turbocharger assemblies may have two strands of sub-synchronous vibrations 210, 220 (as shown in FIG. 2), other turbocharger assemblies may have only a single strand of sub-synchronous vibrations while still other turbocharger assemblies may have more than two strands of sub-synchronous vibrations. Where there is more than one strand, it may be that one or more than one strand may be used as part of the method of the present disclosure.

The difference between the synchronous and sub-synchronous vibrations are further illustrated by the additional graphical representations of FIGS. 2b and 2c.

FIG. 2b shows vibrational behaviour of the turbocharger shaft wherein the x- and y-axes are six orders of magnitude different from the z-axis. Differences between the synchronous vibrational behaviour 201 and the sub-synchronous vibrational behaviour 211 are evident.

FIG. 2c shows vibrational behaviour of the turbocharger shaft in the e- and y-axes only.

Figure 3:
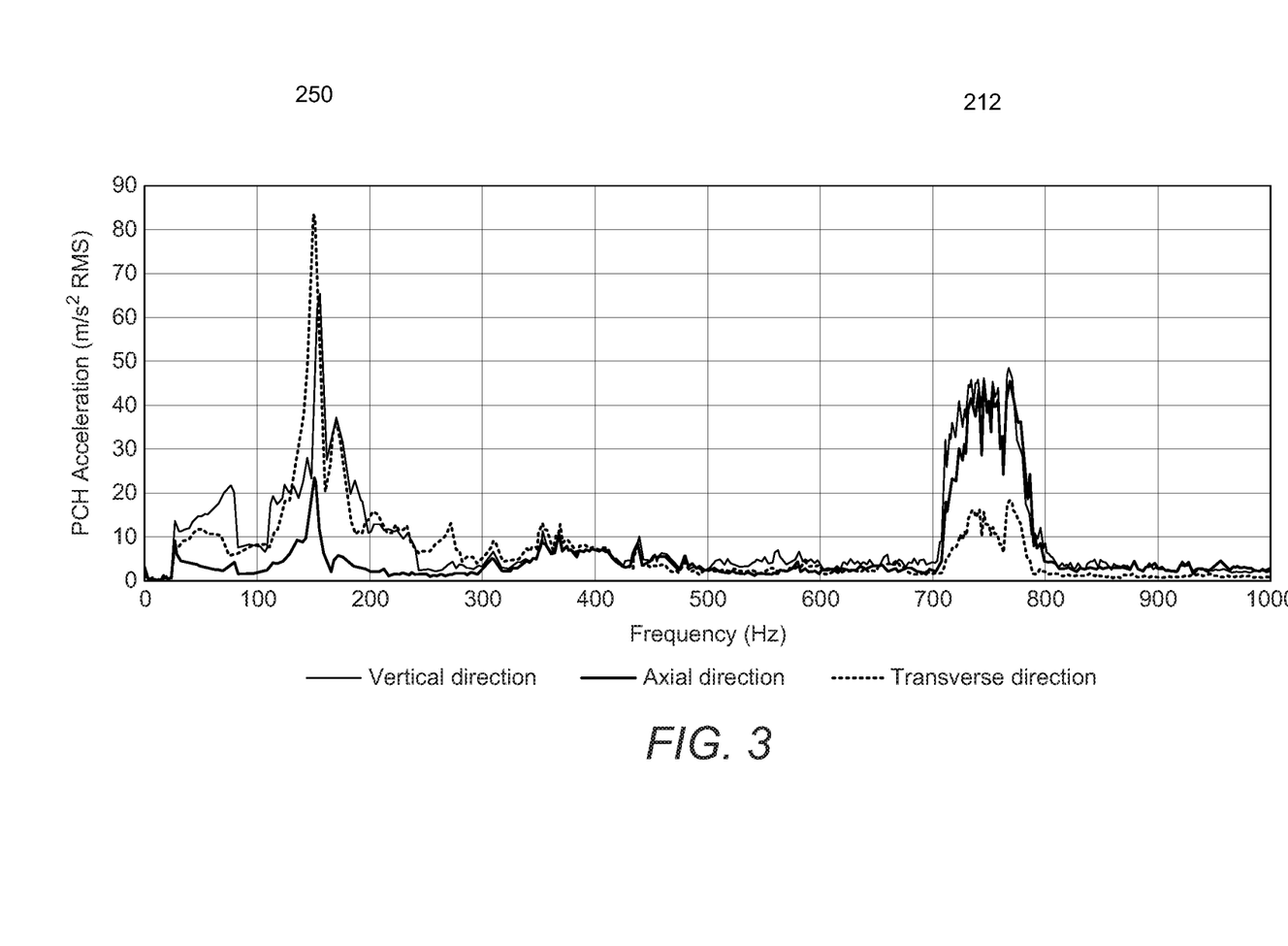
FIG. 3 shows a plot of accelerometer value against frequency showing the frequency gap between the rotational frequency of the engine and the sub-synchronous frequency of the turbocharger.

FIG. 3 shows a plot of accelerometer value, for acceleration in three different directions (vertical, axial and transverse), against frequency.

The peak of frequencies 250 at around 150 Hz are representative of vibrations that are synchronous with the engine (not synchronous with the turbocharger), A frequency of 150 Hz equates to an engine speed, of 9,000 rpm.

The peak of frequencies 212 that occur between 700 and 800 Hz equate to sub-synchronous vibrational behaviour of the turbocharger. (Note that synchronous vibrational behaviour of the turbocharger is not shown in FIG. 3 as it occupies frequencies significantly higher than those accommodated on the x-axis of FIG. 3. Note also that the data shown in FIG. 3 are for a different turbocharger assembly to the turbocharger assembly whose data are shown in FIGS. 2a, 2b and 2c.)

Figure 4:
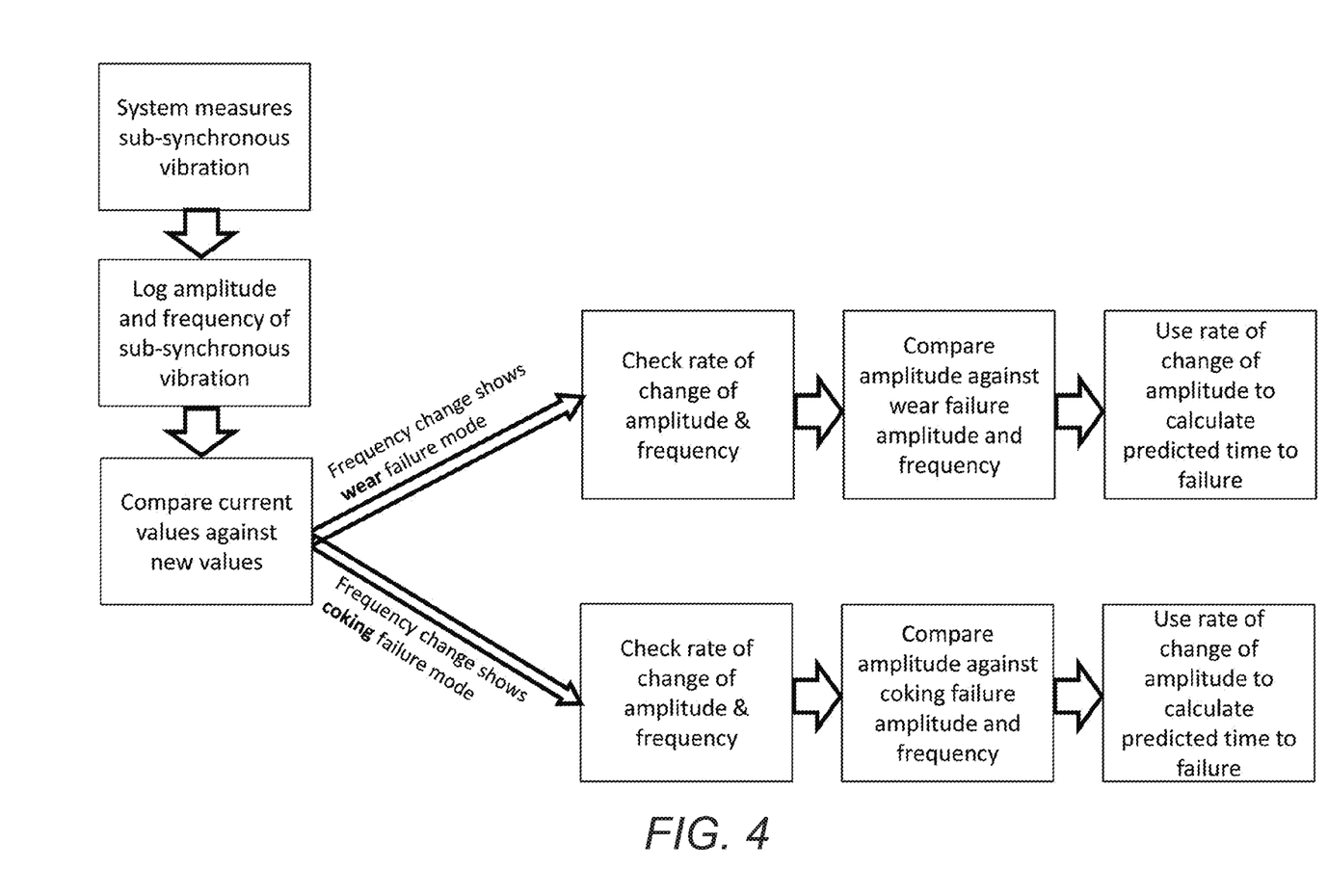
FIG. 4 shows a flow chart that explains at a high level the process of using sub-synchronous turbocharger vibrational behaviour to infer failure mode and time to failure.

A highly schematic representation of the logic of the present disclosure is shown in FIG. 4.

This shows that differences in behaviour of sub-synchronous frequency change and amplitude change are used to infer type of failure mode. The examples shown in FIG. 4 are failure due to wear and failure due to coking.

Gradual increase in frequency of sub-synchronous vibration may be indicative of a coking failure mode.

Gradual decrease in frequency of sub-synchronous vibration may be indicative of a wear failure mode.

Having identified the potential failure mode, rate of change of amplitude and frequency of the sub-synchronous vibration are monitored to calculate a likely time to failure.

Figure 5:
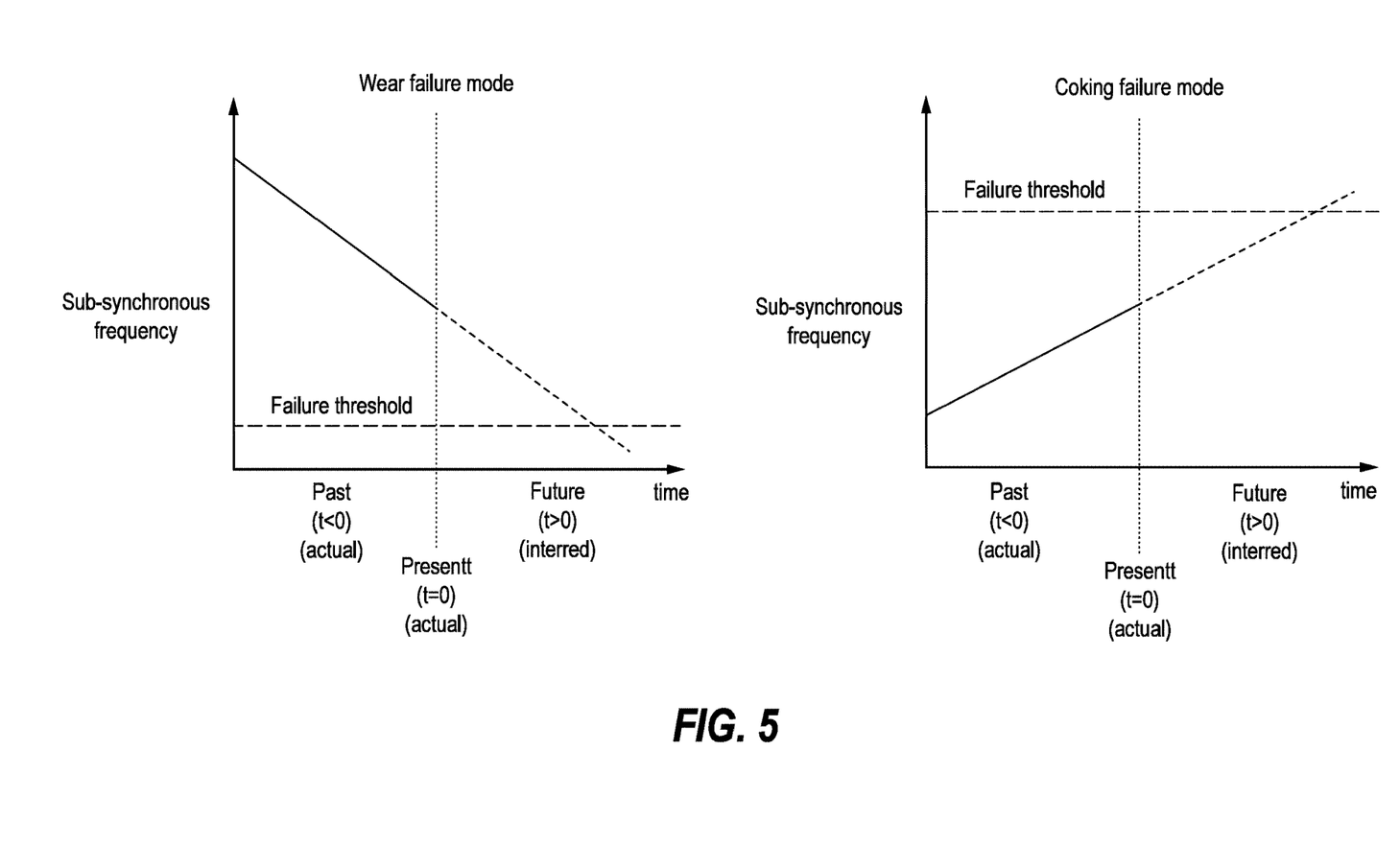
FIG. 5 shows two highly schematic plots of sub-synchronous frequency versus time, one for each of two failure modes.

FIG. 5 shows how, in one implementation, (a) direction of change of sub-synchronous frequency is used to distinguish between coking failure mode and wear failure mode and (b) how rate of change of sub-synchronous frequency if used to infer a time to likely failure.

It has been determined that for wear and coking failure modes the rate of change of sub-synchronous frequency is likely to remain constant. In other words, for these failure modes, the sub-synchronous frequency changes linearly with time. Therefore, as shown in FIG. 5, based on past rate of change of sub-synchronous frequency, future frequency behaviour is predicted by plotting a straight line and determining a time at which the sub-synchronous frequency is expected to cross a threshold frequency.

It should be noted that other failure modes may not necessarily exhibit a linear relationship. For example, there may be some potential failure modes in which the rate of change of sub-synchronous frequency may increase with time. In such circumstances the sub-synchronous frequency change may be exponential.

The method of the present disclosure may involve performing sub-synchronous frequency analysis at or towards the end of the manufacturing process to determine sub-synchronous behaviour in a new product prior to any effects of wear and coking becoming apparent.

Such testing may reveal one or more than one sub-synchronous frequency region. The FIG. 2a arrangement shows two sub-synchronous frequency regions. These may be used as the starting point from which progressive failure influences may be inferred.

Information regarding potential failure predictions may be made available to the operator of the machine containing the turbocharger. It may be notified locally or perhaps transmitted to a fleet manager or possibly both. This may enable maintenance to be scheduled in advance for an appropriate time and for provisions to be made to minimise machine downtime and/or to ensure that the downtime occurs when it is least likely to have a significant impact. Further, it avoids the risk of failure without warning, which means that unexpected and unplanned downtime is significantly reduced or eliminated.

INDUSTRIAL APPLICABILITY

The method of the present disclosure may be particularly helpful in predicting potential failure modes and predicted failure timings in order to enable planned maintenance to be performed at a suitable time in advance of failure which reduces a risk of unplanned downtime which is generally less convenient and more costly.

It is possible that the hardware involved in carrying out the method may be retrofitted to an engine assembly in order to provide functionality that may not originally have been present on the engine assembly.

For example, the accelerometer may be directly attached to the turbocharger assembly or to the internal combustion engine.

In one embodiment, the accelerometer may be part of an oil fuel filler cap 114 of the internal combustion engine. In this way, it may be straightforward for an operator with no detailed knowledge of the apparatus to switch a standard oil fuel filler cap with one including an accelerometer in order to provide the additional hardware in a straightforward and cost effective manner.

In another embodiment, the turbocharger may include a controller 126 configured to reCeive the data from the accelerometer and to perform the method of the present disclosure.

What is claimed is:

1. A method of monitoring a turbocharger system, the method comprising:
   measuring amplitude of vibration of the turbocharger system across a range of frequencies;
   identifying a sub-range of frequencies within the range of frequencies that are at a higher frequency than maximum engine rotation frequency and at a lower frequency than maximum turbocharger rotation frequency wherein the sub-range of frequencies includes a local peak in amplitude of vibration;
   determining a direction of change of a characteristic of the local peak in order to select between a first failure mode prediction strategy comprising a first failure mode threshold value and a second failure mode prediction strategy comprising a second failure mode threshold;
   determining a rate of change of the characteristic of the local peak; and
   using the rate of change of the characteristic of the local peak to determine a time period after which the characteristic will cross a threshold value;
   wherein in the first failure mode the threshold value is the first failure mode threshold value; and
   wherein in the second failure mode the threshold value is the second failure mode threshold value.

2. The method of claim 1 wherein:
   the first failure mode is a wear failure mode prediction strategy;
   the first failure mode threshold value is a wear failure mode threshold value; and
   the direction of change of the characteristic of the local peak is positive.

3. The method of claim 2 wherein the wear failure mode prediction strategy comprises using the rate of change of the characteristic of the local peak to predict a period of operation after which the local peak will fall below the wear failure mode threshold value.

4. The method of claim 1 wherein;
   the second failure mode is a coking failure mode prediction strategy;
   the second failure mode threshold value is a coking failure mode threshold value; and
   the direction of change of the characteristic of the local peak is negative.

5. The method of claim 4 wherein the coking failure mode prediction strategy comprises using the rate of change of the characteristic of the local peak to predict a period of operation after which the local peak will exceed the coking failure mode threshold value.

6. The method of claim 1 wherein the characteristic of the local peak comprises frequency of the local peak.

7. The method of claim 1 wherein the characteristic of the local peak comprises the amplitude of the local peak.

8. The method of claim 1 wherein the sub-range of frequencies has a lower frequency bound of 500 Hz and an upper frequency bound of 1,000 Hz.

9. The method of claim 1 wherein the local peak amplitude is at least double a vibrational amplitude for neighbouring frequencies.

10. The method of claim 1 wherein maximum engine rotation frequency is less than 300 and maximum turbocharger rotation frequency is more than 800 Hz.

11. A turbocharger assembly comprising:
    an accelerometer configured to provide data regarding amplitude of vibration of a turbocharger system across a range of frequencies;
    a controller configured to receive the data from the accelerometer and to perform the method of claim 1.

12. A machine comprising an internal combustion engine and the turbocharger assembly of claim 11.

13. The machine of claim 12 wherein the accelerometer is directly attached to the internal combustion engine.

14. The machine of claim 12 wherein the turbocharger assembly comprises an oil filler cap for sealing an oil filler port of the internal combustion engine and wherein the oil filler cap comprises the accelerometer.

15. The method of claim 9 wherein the local peak amplitude is at least four times the vibrational amplitude for neighbouring frequencies.

* * * * *